United States Patent
Dekel et al.

(10) Patent No.: US 12,554,307 B2
(45) Date of Patent: Feb. 17, 2026

(54) PRESENCE DETECTION POWER EFFICIENCY IMPROVEMENTS

(71) Applicant: Microsoft Technology Licensing, LLC, Redmond, WA (US)

(72) Inventors: Shoham Dekel, Tel-Aviv (IL); Gilad Pundak, Rehovot (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 137 days.

(21) Appl. No.: 18/148,505

(22) Filed: Dec. 30, 2022

(65) Prior Publication Data
US 2024/0219990 A1 Jul. 4, 2024

(51) Int. Cl.
G06F 1/3231 (2019.01)
H04N 23/65 (2023.01)

(52) U.S. Cl.
CPC ......... *G06F 1/3231* (2013.01); *H04N 23/651* (2023.01)

(58) Field of Classification Search
CPC ............................ G06F 1/3231; H04N 23/651
USPC ....................................................... 713/323
See application file for complete search history.

(56) References Cited

U.S. PATENT DOCUMENTS

| | | | | |
|---|---|---|---|---|
| 5,661,780 A | * | 8/1997 | Yamamoto | H04M 1/72502 455/573 |
| 5,794,137 A | * | 8/1998 | Harte | H04W 52/0283 455/574 |
| 5,822,597 A | * | 10/1998 | Kawano | G06F 1/3203 713/323 |
| 5,826,015 A | * | 10/1998 | Schmidt | H04L 63/0435 709/229 |
| 9,848,167 B1 | * | 12/2017 | Christian | H04N 7/142 |
| 10,524,330 B1 | | 12/2019 | Wagner et al. | |
| 10,791,252 B2 | * | 9/2020 | Tsurube | H04N 23/811 |
| 2004/0114737 A1 | * | 6/2004 | MacConnell | H04L 12/12 379/106.03 |

(Continued)

FOREIGN PATENT DOCUMENTS

CN 112835442 A 5/2021

OTHER PUBLICATIONS

International Search Report and Written Opinion received for PCT Application No. PCT/US23/037045, Apr. 4, 2024, 11 pages.

(Continued)

*Primary Examiner* — Paul R. Myers
(74) *Attorney, Agent, or Firm* — Weaver IP L.L.C.

(57) ABSTRACT

Systems and methods are described for reducing the power consumption of a camera-based presence detection system of a user device. The camera-based presence detection system is used to transition the user device from a low-power mode to another power mode when the presence of a user is detected. To reduce the power consumption of the camera-based presence detection system, an operating parameter of the camera-based presence detection system may be modified based on contextual information received while the user device is in the low-power mode. For example, an operating parameter of the camera-based presence detection system is modified when the contextual information indicates that there is a reduced reliability or utility of the camera-based presence detection system.

17 Claims, 5 Drawing Sheets

(56) References Cited

U.S. PATENT DOCUMENTS

| | | | |
|---|---|---|---|
| 2004/0175167 A1* | 9/2004 | Takato | G03B 13/18 396/114 |
| 2006/0018539 A1* | 1/2006 | Sato | G06V 10/20 382/173 |
| 2008/0215232 A1* | 9/2008 | Ikeda | G08G 1/164 701/532 |
| 2009/0122169 A1* | 5/2009 | Agan | H04N 23/57 348/340 |
| 2010/0081392 A1* | 4/2010 | Rousseau | H04L 12/2838 455/67.14 |
| 2010/0281277 A1* | 11/2010 | Qin | G06F 1/3203 713/300 |
| 2010/0332868 A1* | 12/2010 | Tan | G06F 1/3206 713/310 |
| 2011/0134251 A1* | 6/2011 | Kim | H04N 23/23 348/E5.09 |
| 2011/0158303 A1* | 6/2011 | Gauthier | H04W 52/0283 375/224 |
| 2011/0205186 A1* | 8/2011 | Newton | G06F 3/0428 345/175 |
| 2011/0205406 A1 | 8/2011 | Gough | |
| 2011/0230228 A1 | 9/2011 | Young et al. | |
| 2011/0312285 A1* | 12/2011 | Amir | H04W 52/0225 455/69 |
| 2012/0179300 A1* | 7/2012 | Warren | F24F 11/30 700/278 |
| 2013/0222611 A1 | 8/2013 | Hsu | |
| 2014/0366111 A1* | 12/2014 | Sheller | G06F 21/316 726/7 |
| 2015/0124157 A1* | 5/2015 | Hongu | H04N 23/672 348/353 |
| 2016/0034019 A1* | 2/2016 | Seo | H04N 5/63 345/593 |
| 2017/0028995 A1* | 2/2017 | Mori | B60W 30/12 |
| 2017/0122749 A1* | 5/2017 | Urano | G01S 19/42 |
| 2017/0139471 A1* | 5/2017 | Bury | G06F 1/3231 |
| 2018/0182491 A1* | 6/2018 | Belliveau | H04W 12/068 |
| 2019/0005953 A1* | 1/2019 | Bundalo | G06F 1/3287 |
| 2019/0007622 A1* | 1/2019 | Fujihashi | G06F 3/0416 |
| 2019/0129491 A1* | 5/2019 | Biederman, III | G06F 3/017 |
| 2020/0026342 A1* | 1/2020 | Sengupta | G06F 3/0416 |
| 2020/0159305 A1 | 5/2020 | Bartscherer | |
| 2020/0326768 A1* | 10/2020 | Wahl | G06F 1/28 |
| 2021/0342008 A1 | 11/2021 | Sachidanandam et al. | |
| 2022/0057866 A1 | 2/2022 | Xu | |
| 2023/0419962 A1* | 12/2023 | Kim | G10L 17/02 |
| 2024/0143536 A1* | 5/2024 | Goh | G06F 13/4068 |

OTHER PUBLICATIONS

International Preliminary Report on Patentability received for PCT Application No. PCT/US2023/037045, Jul. 10, 2025, 10 pages.

* cited by examiner

PRESENCE DETECTION POWER EFFICIENCY IMPROVEMENTS

BACKGROUND

In a perfect world, a user device is always to be ready for use by the user. However, keeping a user device at a constant state of readiness is impractical because it results in increased power consumption and the shortened life of device components. As such, user devices are typically placed in a low-power mode when not in use. When a user device is in a low-power mode, a presence detection system can be used to prime a user device so that it is ready to use when the user interacts with the user device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods described herein reduce the power consumption of a camera-based presence detection system. A camera-based presence detection system may be included in a user device to transition the user device from a low-power mode to another power mode upon detecting a user's presence. This improves response time by shortening the time until the user device is ready for use. However, the reliability and utility of a camera-based presence detection system varies depending on the context of the user device. For example, a camera-based presence detection system is ineffective when the camera is obstructed or when the user device is in a low-light environment. To reduce the power consumption of a camera-based presence detection system, embodiments described herein utilize contextual information to determine when the camera-based presence detection system has reduced reliability and/or utility and then modify one or more operating parameters of the camera-based presence detection system based on such contextual information.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
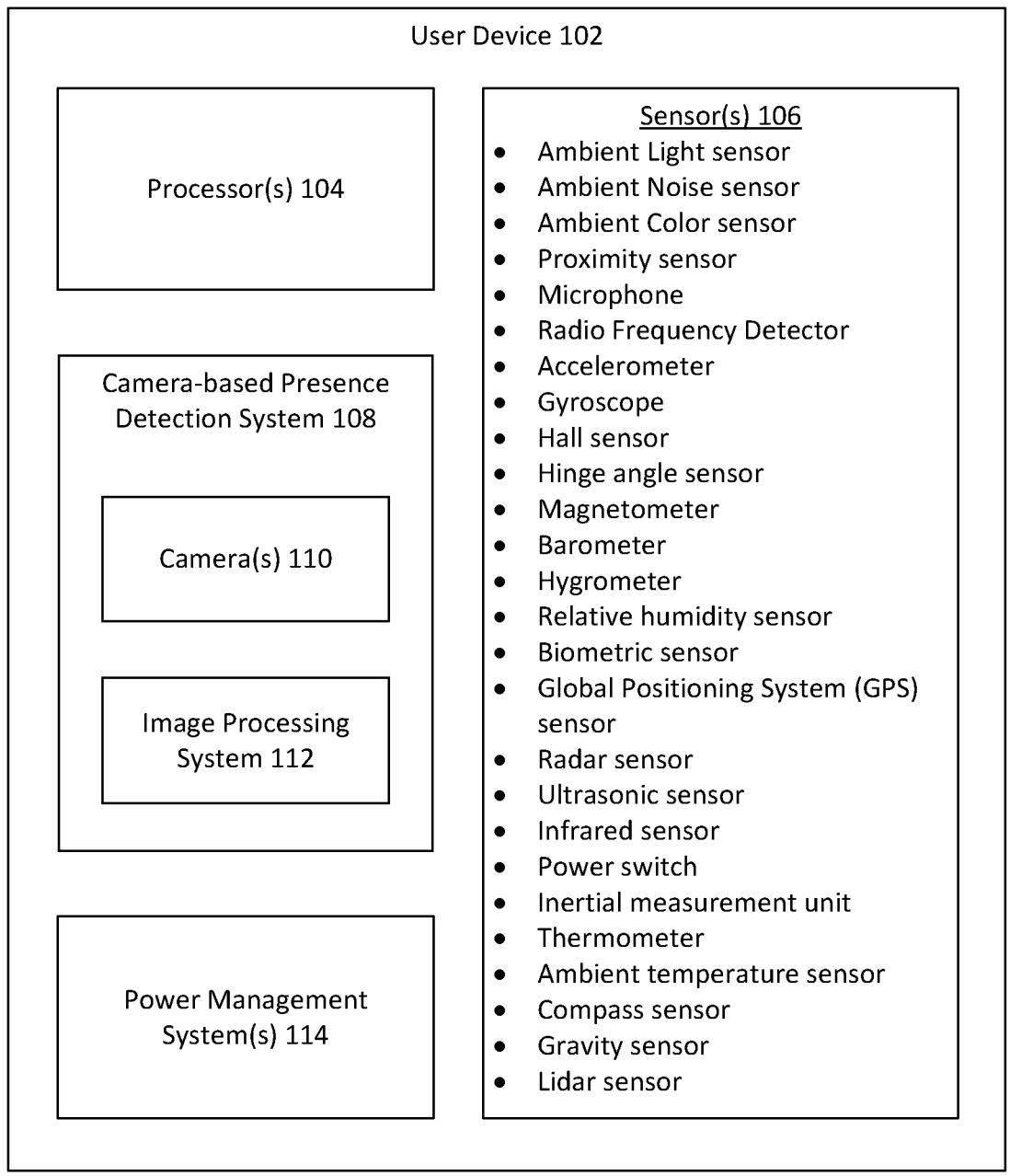
FIG. 1 shows a block diagram of an example system that reduces the power consumption of a user device, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

As discussed in the Background Section above, presence detection systems may be used to transition a user device from a low-power mode to another power mode (e.g., a higher-power or full-power mode) to reduce the time needed to ready the device for use by the user. However, presence detection systems themselves consume power using sensors and processing cycles needed to determine the presence of the user. As such, there is a need to limit the power consumption of presence detection systems. The effectiveness of presence detection systems varies depending on various factors. For example, camera-based presence detection systems may have reduced reliability or utility based on environmental factors, historical information, and/or the current state of the user device. To improve power consumption efficiency, a camera-based presence detection system is used in a manner that generates the most benefit to the user. For example, a camera-based presence detection system that is ineffective in a low-light environment may be deactivated when contextual information indicates that the user device is in a low-light environment. Alternatively, the camera-based presence detection system may be deactivated when the user is unlikely to use the user device. For example, contextual information may indicate that the user is asleep or far away from the user device and is therefore unlikely to interact with the user device. Furthermore, the manner in which the camera-based presence detection system is used can be adjusted over time based on historical information. For example, the operation of the camera-based presence detection system can be modified based on a count of false wake events where the camera-based presence detection system transitions the user device from a low-power state, but the user does not interact with the user device.

II. Example Embodiments

Systems and methods described herein reduce the power consumption of a camera-based presence detection system. A camera-based presence detection system may be included in user device to transition the user device from a low-power mode to another power mode (e.g., a higher-power mode or full-power mode) upon detecting a user's presence. This improves response time by shortening the time until the user device is ready for use. However, the reliability and utility of a camera-based presence detection system varies depending on the context. For example, a camera-based presence detection system is ineffective when the camera is obstructed or when the user device is in a low-light environment. To reduce the power consumption of a camera-based presence detection system, operating parameter(s) of the camera-based presence detection system may be modified when the camera-based presence detection system has reduced reliability or utility based on contextual information.

To help illustrate the aforementioned systems and methods, FIG. 1 will now be described. In particular, FIG. 1 is a block diagram of an example system 100 that reduces the power consumption of a user device, in accordance with an embodiment. As shown in FIG. 1, system 100 includes a user device 102. User device 102 includes one or more processors 104, one or more sensors 106, a camera-based presence detection system 108, and one or more power management systems 114.

Processor(s) 104 may include, but are not limited to, a processor having a low-power component or mode, a co-processor of user device 102, an ultra-low-voltage processor, and/or an always-on processor. When user device 102 is operating in a low-power mode, one or more of processor(s) 104 (e.g., a main processor) may be powered down or in a low-power state. While in the low-power mode, the functions performed by user device 102 may be limited and may be performed, for example, by a low-power component of processor(s) 104, a co-processor, an ultra-low-voltage processor, and/or an always-on processor. In some embodiments, some or all of the functions performed by camera-based presence detection system 108 and/or power management system(s) 114 while user device 102 is in a low-power mode are executed by the low-power component of processor(s) 104, a co-processor, an ultra-low-voltage processor, and/or an always-on processor.

Sensor(s) 106 may include one or more of: an ambient light sensor, an ambient noise sensor, an ambient color sensor, a proximity sensor, a microphone, a radio frequency detector, an accelerometer, a gyroscope, a Hall sensor, a hinge angle sensor, a magnetometer, a barometer, a hygrometer, a relative humidity sensor, a biometric sensor, a Global Positioning System (GPS) sensor, a radar sensor, an ultrasonic sensor, an infrared sensor, a power switch, an inertial measurement unit, a thermometer, an ambient temperature sensor, a compass sensor, a motion sensor, a gravity sensor, and/or a lidar sensor.

Camera-based presence detection system 108 may include one or more camera(s) 110 and an image processing system 112. In some embodiments, some, or all of sensor(s) 106 and/or camera(s) 110, may be external components that are connected (e.g., via a wired or wireless connection), to user device 102.

User device 102 may be any type of computing device, including a stationary or mobile computing device. Examples of a stationary computing device include but are not limited to a desktop computer, a personal computer (PC), a video game console, or a smart appliance (e.g., a smart television). Examples of a mobile computing device include but are not limited to a smart phone, a laptop computer, a notebook computer, a tablet computer, a netbook, or a wearable computing device (e.g., a smart watch, a head-mounted device including smart glasses such as Google® Glass™, etc.).

Figure 2:
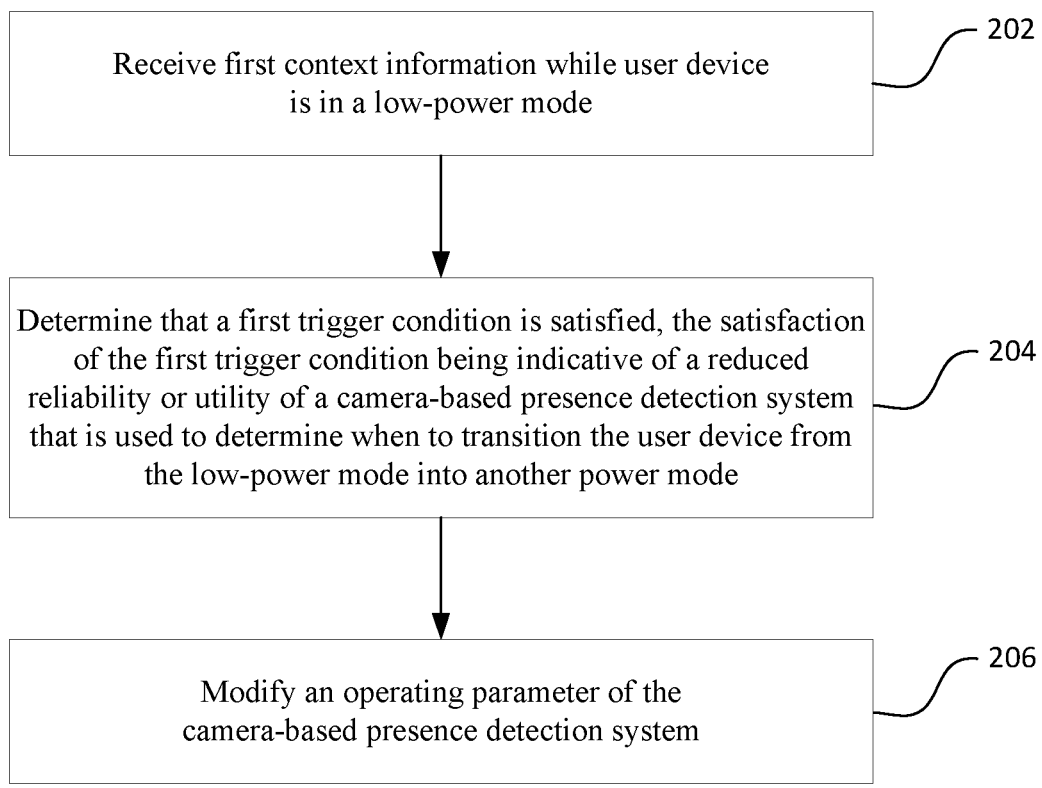
FIG. 2 depicts a flowchart of a process for modifying an operating parameter of a camera-based detection system based on contextual information, in accordance with an embodiment.

To further illustrate the foregoing features of user device 102, FIG. 2 is described. FIG. 2 depicts a flowchart 200 of a process for modifying an operating parameter of a camera-based detection system based on contextual information, in accordance with an embodiment. System 100 may operate according to flowchart 200 in embodiments. Note that not all steps of flowchart 200 need be performed in embodiments. Further structural and operational embodiments will be apparent to persons skilled in the relevant art(s) based on the following description of FIG. 2. FIG. 2 is described as follows with reference to system 100 of FIG. 1.

Flowchart 200 begins at step 202. In step 202, first context information is received while the user device is in a low-power mode. For example, power management system(s) 114 may receive first context information from sensor(s) 106, camera-based presence detection system 108, and/or power management system(s) 114. First context information received from sensor(s) 106, camera-based presence detection system 108, and/or power management system(s) 114 may include, but is not limited to, ambient light information, ambient noise information, ambient color information, proximity information, humidity information, inertial information, magnetic field information, hinge angle information of a hinge of the user device, directional orientation information of the user device, power state information of the user device, image saturation information, a number of persons detected by the camera-based presence detection system, an object detected by the camera-based presence detection system, an obstruction detected by the camera-based presence detection system, an inter-frame difference, and/or a count of false wake events.

In step 204, it is determined whether a first trigger condition is satisfied, the satisfaction of the first trigger condition being indicative of a reduced reliability or utility of a camera-based presence detection system that is used to determine when to transition the user device from the low-power mode into another power mode. For example, power management system(s) 114 may analyze the first context information to determine whether camera-based presence detection system 108 has reduced reliability or utility.

In some embodiments, power management system(s) 114 may determine, based on ambient light information from sensor(s) 106, that the amount of ambient light reduces the reliability or utility of camera-based presence detection. For example, the first trigger condition may include the ambient light information satisfying a pre-determined relationship with an ambient light threshold. When ambient light information from sensor(s) 106 indicate that the amount of ambient light (e.g., direct sunlight or complete darkness) would limit the reliability or utility of camera-based presence detection system 108, power management system(s) 114 may modify operating parameter(s) of camera-based presence detection system to reduce the power consumption of camera-based presence detection system 108. For example, the reliability of camera-based presence detection system 108 may be reduced by the lighting conditions such that the power consumption costs outweigh the benefits of camera-based presence detection.

In some embodiments, power management system(s) 114 may determine, based on ambient noise information from sensor(s) 106, that the amount of ambient noise indicates that presence of multiple persons that may reduce the reliability or utility of camera-based presence detection. For example, the first trigger condition may include the ambient noise information satisfying a pre-determined relationship with an ambient noise threshold. When ambient noise information from sensor(s) 106 indicate a noisy environment (e.g., the presence of multiple persons) that may limit the reliability or utility of camera-based presence detection system 108, power management system(s) 114 may modify operating parameter(s) of camera-based presence detection system to reduce the power consumption of camera-based presence detection system 108. For example, the presence of multiple persons may result in a high number of false wake events where camera-based presence detection system 108 transitions user device 102 from the low-power mode without any subsequent user interaction with user device 102. In order to reduce power consumption associated with false wake events, power management system(s) 114 may modify operating parameter(s) of camera-based presence detection system to reduce the likelihood of false wake events.

In some embodiments, power management system(s) 114 may determine, based on ambient color information from sensor(s) 106, that the ambient color indicates, for example, a location (e.g., indoors, or outdoors) or time of day (e.g., sunrise or sunset) that may reduce the reliability or utility of camera-based presence detection. For example, the first trigger condition may include the ambient color information satisfying a pre-determined relationship with an ambient color condition. When ambient color information from sensor(s) 106 indicate a scenario (e.g., location or time of day) that may limit the reliability or utility of camera-based presence detection system 108, power management system(s) 114 may modify operating parameter(s) of camera-based presence detection system to reduce the power consumption of camera-based presence detection system 108. For example, power management system(s) 114 may learn over time that a user walks by user device 102 every morning during sunrise without interacting with user device 102. In order to reduce the power consumption associated this scenario, power management system(s) 114 may modify operating parameter(s) of camera-based presence detection system to reduce the likelihood of transitioning user device 102 from the low-power mode in this scenario.

In some embodiments, power management system(s) 114 may determine, based on proximity information from sensor(s) 106, that user device 102 is in proximity to an obstruction that may reduce the reliability or utility of camera-based presence detection. For example, the first trigger condition may include the proximity information satisfying a pre-determined relationship with a distance threshold. In some embodiments, the proximity information may be based on, for example, a radar-based sensor, a sonar-based or ultrasonic-based sensor, an infrared-based sensor, a radio frequency sensor, a lidar sensor, and/or a biometric sensor. When proximity information from sensor(s) 106 indicate the presence of an object (e.g., obstruction) that may limit the reliability or utility of camera-based presence detection system 108, power management system(s) 114 may modify operating parameter(s) of camera-based presence detection system to reduce the power consumption of camera-based presence detection system 108. For example, proximity information may indicate that the view of camera(s) 110 may be obstructed (e.g., face down on top of a desk). In order to reduce power consumption, power management system(s) 114 may modify operating parameter(s) of camera-based presence detection system when proximity information from sensor(s) 106 indicate that an object may be obstructing the view of camera(s) 110.

In some embodiments, power management system(s) 114 may determine, based on humidity information from sensor(s) 106, that condensation is present on camera(s) 110 that may reduce the reliability or utility of camera-based presence detection. For example, the first trigger condition may include the humidity information satisfying a pre-determined relationship with a humidity threshold. In some embodiments, the humidity information may be based on, for example, a hygrometer, a relative humidity sensor, a thermometer, an ambient temperature sensor, and/or any similar sensor capable of providing information necessary to calculate the relative humidity. When humidity information from sensor(s) 106 indicate the presence of condensation that may limit the reliability or utility of camera-based presence detection system 108, power management system(s) 114 may modify operating parameter(s) of camera-based presence detection system to reduce the power consumption of camera-based presence detection system 108. For example, humidity information may indicate that the view of camera(s) 110 may be obstructed by condensation. In order to reduce power consumption, power management system(s) 114 may modify operating parameter(s) of camera-based presence detection system when humidity information from sensor(s) 106 indicate that condensation may be obstructing the view of camera(s) 110.

In some embodiments, power management system(s) 114 may determine, based on inertial information from sensor(s) 106, that the movement or orientation of user device 102 may reduce the reliability or utility of camera-based presence detection. For example, the first trigger condition may include inertial information indicating a movement or orientation satisfying a pre-determined condition. In some embodiments, the inertial information may be determined based on, for example, an accelerometer, a gyroscope, a Global Positioning System (GPS) sensor, an inertial measurement unit, a compass sensor, a motion sensor, and/or a gravity sensor. When inertial information from sensor(s) 106 indicate the that movement or orientation of user device 102 may limit the reliability or utility of camera-based presence detection system 108, power management system(s) 114 may modify operating parameter(s) of camera-based presence detection system to reduce the power consumption of camera-based presence detection system 108. For example, inertial information may indicate that user device 102 is being carried by the user inside a bag. The utility of camera-based presence detection system 108 may be limited in this scenario. In order to reduce the power consumption associated this scenario, power management system(s) 114 may modify operating parameter(s) of camera-based presence detection system to reduce the likelihood of transitioning user device 102 from the low-power mode in this scenario.

In some embodiments, power management system(s) 114 may determine, based on magnetic field information from sensor(s) 106, that a lid or cover of user device 102 is in a position that may reduce the reliability or utility of camera-based presence detection. For example, the first trigger condition may include the magnetic field information satisfying a pre-determined relationship with a threshold. In some embodiments, the magnetic field information may be determined based on, for example, a magnetometer, and/or a Hall sensor. When magnetic field information from sensor(s) 106 indicate the presence of an object (e.g., lid or cover) that may limit the reliability or utility of camera-based presence detection system 108, power management system(s) 114 may modify operating parameter(s) of camera-based presence detection system to reduce the power consumption of camera-based presence detection system 108. For example, magnetic field information may indicate that the view of camera(s) 110 may be obstructed by a lid or cover of user device 102. In order to reduce power consumption, power management system(s) 114 may modify operating parameter(s) of camera-based presence detection system when magnetic field information from sensor(s) 106 indicate that an object may be obstructing the view of camera(s) 110.

In some embodiments, power management system(s) 114 may determine, based on hinge angle information from sensor(s) 106, that a lid or cover of user device 102 is in a position that may reduce the reliability or utility of camera-based presence detection. For example, the first trigger condition may include the hinge angle information satisfying a pre-determined relationship with an angle threshold. In some embodiments, the hinge angle information may be determined based on, for example, a hinge angle sensor. When hinge angle information from sensor(s) 106 indicate the presence of an object (e.g., lid or cover) that may limit the reliability or utility of camera-based presence detection system 108, power management system(s) 114 may modify operating parameter(s) of camera-based presence detection system to reduce the power consumption of camera-based presence detection system 108. For example, hinge angle information may indicate that the view of camera(s) 110 may be limited (e.g., partially or completely closed lid or cover). In order to reduce power consumption, power management system(s) 114 may modify operating parameter(s) of camera-based presence detection system when hinge angle information from sensor(s) 106 indicate that an object may be obstructing the view of camera(s) 110.

In some embodiments, power management system(s) 114 may determine, based on directional orientation information from sensor(s) 106, that user device 102 is oriented in a direction that may reduce the reliability or utility of camera-based presence detection. For example, the first trigger condition may include the directional orientation information satisfying a pre-determined condition. For example, the reliability or utility of camera-based presence detection may be reduced if user device 102 is oriented in a direction that obscures camera(s) 110. For instance, the first trigger condition may be satisfied when camera(s) 110 are pointing up (e.g., toward the ceiling or the sky) or pointing down (e.g., toward a desk or the floor). In some embodiments, the directional orientation information may be determined based on, for example, an accelerometer, a gyroscope, an inertial measurement unit, a compass sensor, a motion sensor, and/or a gravity sensor. In order to reduce power consumption, power management system(s) 114 may modify operating parameter(s) of camera-based presence detection system when directional orientation information from sensor(s) 106 indicate that user device 102 is oriented in a direction that limits the reliability or utility of camera(s) 110.

In some embodiments, power management system(s) 114 may determine, based on power state information from sensor(s) 106 and/or power management system(s) 114, that user device 102 is in a power state (e.g., a low battery state) that may reduce the reliability or utility of camera-based presence detection. In some instances, the first trigger condition may include the power state information indicating a battery level satisfying a pre-determined relationship with a battery-level threshold. In some instances, the first trigger condition may include the power state information indicating that user device 102 is not plugged into an external power source. In some instances, the first trigger condition may include the power state information indicating a user has not activated a power switch of user device 102. For instance, when user device 102 is in a low battery state, the costs of operating camera-based presence detection system 108 may outweigh the benefits of operating camera-based presence detection system 108.

In some embodiments, power management system(s) 114 may determine, based on image saturation information from sensor(s) 106, camera(s) 110, and/or image processing system 112, that the image information from camera(s) 110 is in a state (e.g., oversaturated or undersaturated) that may reduce the reliability or utility of camera-based presence detection. In some instances, the first trigger condition may include image saturation information satisfying a pre-determined relationship with one or more thresholds. For example, when an image sensor of camera(s) 110 is oversaturated or undersaturated, the image sensor may not provide enough useful information for camera-based presence detection system 108 to reliably determine the presence of a user.

In some embodiments, power management system(s) 114 may determine, based on image analysis performed by image processing system 112 on images or frames from camera(s) 110. For example, image processing system 112 may detect the presence of persons or things that may reduce the reliability or utility of camera-based presence detection. Based on this information, power management system(s) 114 may modify operating parameter(s) of camera-based presence detection system 108.

In some instances, image processing system 112 may detect, by analyzing images or frames from camera(s) 110, a number of persons in the image or frame. In some instances, the first trigger condition may include the number of persons detected satisfying a pre-determined relationship with a threshold. In some embodiments, the number of persons in the image or frame may be determined using a machine learning model or classifier. When image analysis performed by image processing system 112 indicates the presence of a threshold number of persons that may limit the reliability or utility of camera-based presence detection system 108, power management system(s) 114 may modify operating parameter(s) of camera-based presence detection system to reduce the power consumption of camera-based presence detection system 108. For example, the presence of multiple persons may result in a high number of false wake events where camera-based presence detection system 108 transitions user device 102 from the low-power mode without any subsequent user interaction with user device 102. In order to reduce power consumption associated with false wake events, power management system(s) 114 may modify operating parameter(s) of camera-based presence detection system to reduce the likelihood of false wake events.

In some instances, image processing system 112 may detect, by analyzing images or frames from camera(s) 110, the presence of an object (e.g., ceiling, floor, keyboard, sky, etc.) in the image or frame. In some instances, the first trigger condition may include the detection of a pre-determined object (e.g., ceiling, floor, keyboard, sky, etc.) in the image or frame. In some embodiments, the object(s) may be determined using a machine learning model or classifier. When image analysis performed by image processing system 112 indicates the presence of an object (e.g., ceiling, floor, keyboard, sky, etc.) that may limit the reliability or utility of camera-based presence detection system 108, power management system(s) 114 may modify operating parameter(s) of camera-based presence detection system to reduce the power consumption of camera-based presence detection system 108. For example, image analysis may indicate that the view of camera(s) 110 may be limited (e.g., pointing down at a keyboard). In order to reduce power consumption, power management system(s) 114 may modify operating parameter(s) of camera-based presence detection system when image analysis indicates that the view of camera(s) 110 may be limited.

In some instances, image processing system 112 may detect, by analyzing images or frames from camera(s) 110, the presence of an obstruction that reduces the reliability or utility of camera-based presence detection system 108. For example, an obstruction may be detected based on low inter-frame differences for at least a portion of the image or frame, or based on object detection using a machine learning model or classifier. In some instances, the first trigger condition may include the inter-frame difference (e.g., percentage) satisfying a pre-determined relationship with one or more thresholds. When image analysis performed by image processing system 112 indicates the presence of an object (e.g., dirt, smudge, condensation, etc.) that may limit the reliability or utility of camera-based presence detection system 108, power management system(s) 114 may modify operating parameter(s) of camera-based presence detection system to reduce the power consumption of camera-based presence detection system 108. For example, image analysis may indicate that the view of camera(s) 110 may be limited by an obstruction (e.g., dirt, smudge, condensation, etc.). In order to reduce power consumption, power management system(s) 114 may modify operating parameter(s) of camera-based presence detection system when image analysis indicates that the view of camera(s) 110 may be limited.

In some instances, image processing system 112 may detect, by analyzing images or frames from camera(s) 110, an inter-frame difference in the image or frame. For example, a high inter-frame difference may indicate a high-level of activity in the image or frame may cause camera-based presence detection system 108 to wake user device 102 too frequently, thereby diminishing its utility. In some instances, the first trigger condition may include the inter-frame difference (e.g., percentage) satisfying a pre-determined relationship with one or more thresholds. When image analysis performed by image processing system 112 indicates a busy environment (e.g., presence of multiple persons) that may limit the reliability or utility of camera-based presence detection system 108, power management system(s) 114 may modify operating parameter(s) of camera-based presence detection system to reduce the power consumption of camera-based presence detection system 108. For example, the presence of multiple persons may result in a high number of false wake events where camera-based presence detection system 108 transitions user device 102 from the low-power mode without any subsequent user interaction with user device 102. In order to reduce power consumption associated with false wake events, power management system(s) 114 may modify operating parameter(s) of camera-based presence detection system to reduce the likelihood of false wake events.

In step 206, an operating parameter of the camera-based presence detection system is modified. For example, power management system(s) 114 may disable one or more of camera(s) 110, decrease a frame rate of one or more of camera(s) 110, decrease a frame processing rate of image processing system 112, decrease a distance-based threshold at which camera-based presence detection system 108 returns a positive result indicating the presence of a user, and/or increase a confidence-based threshold at which camera-based presence detection system 108 returns a positive result indicating the presence of a user. Such modifications improve the power consumption efficiency by reducing the power consumption of camera-based presence detection system 108 without significantly affecting the user experience.

In some embodiments, the first context information is compared to a pre-determined threshold to determine whether the first trigger condition is satisfied. In other embodiments, an aggregate score may be calculated using the first context information, and the aggregate score is compared to a pre-determined threshold to determine whether the first trigger condition is satisfied. In some embodiments, the aggregate score may be calculated using a weighted function by multiplying one or more weights with one or more first context information, including, but not limited to, ambient light information, ambient noise information, ambient color information, proximity information, humidity information, inertial information, magnetic field information, hinge angle information of a hinge of the user device, directional orientation information of the user device, power state information of the user device, image saturation information, a number of persons detected by the camera-based presence detection system, an object detected by the camera-based presence detection system, an obstruction detected by the camera-based presence detection system, an inter-frame difference, and/or a count of false wake events, to obtain one or more weighted first context information, and subsequently performing an operation (e.g., add, subtract, multiply, divide) on the one or more weighted first context information. In some embodiments, one or more of the weights may be predetermined. In some embodiments, one or more of the weights may be, dynamically and/or automatically, modified based on the values of one or more of the factors. In other embodiments, the aggregate score may be an output from a machine learning model.

Figure 3:
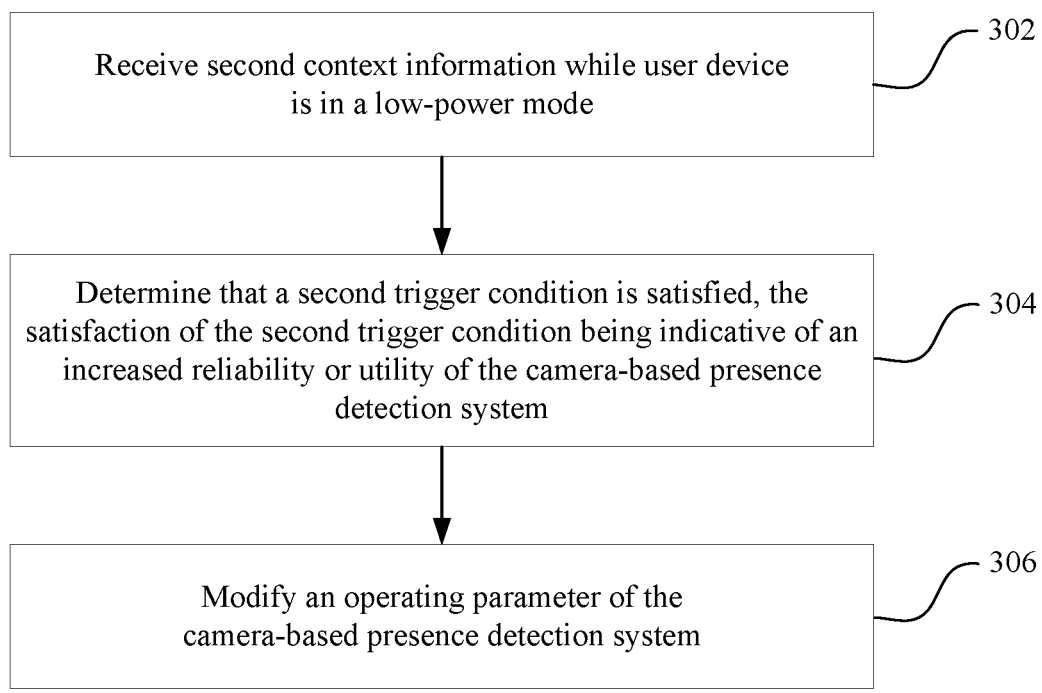
FIG. 3 depicts a flowchart of a process for modifying an operating parameter of a camera-based detection system based on contextual information, in accordance with an embodiment.

To further illustrate the foregoing features of user device 102, FIG. 3 is described. FIG. 3 depicts a flowchart 300 of a process for modifying an operating parameter of a camera-based detection system based on contextual information, in accordance with an embodiment. System 100 may operate according to flowchart 300 in embodiments. Note that not all steps of flowchart 300 need be performed in embodiments. Further structural and operational embodiments will be apparent to persons skilled in the relevant art(s) based on the following description of FIG. 3. FIG. 3 is described as follows with reference to system 100 of FIG. 1.

Flowchart 300 begins at step 302. In step 302, second context information is received while the user device is in a low-power mode. For example, power management system(s) 114 may receive second context information from sensor(s) 106, camera-based presence detection system 108, and/or power management system(s) 114. Second context information received from sensor(s) 106, camera-based presence detection system 108, and/or power management system(s) 114 may include, but is not limited to, ambient light information, ambient noise information, ambient color information, proximity information, humidity information, inertial information, magnetic field information, hinge angle information of a hinge of the user device, directional orientation information of the user device, power state information of the user device, image saturation information, a number of persons detected by the camera-based presence detection system, an object detected by the camera-based presence detection system, an obstruction detected by the camera-based presence detection system, an inter-frame difference, and/or a count of false wake events.

In step 304, it is determined whether a second trigger condition is satisfied, the satisfaction of the second trigger condition being indicative of an increased reliability or utility of the camera-based presence detection system. For example, power management system(s) 114 may analyze the second context information to determine whether the reliability or utility of camera-based presence detection system 108 has increased.

In some embodiments, power management system(s) 114 may determine, based on ambient noise information from sensor(s) 106, that the amount of ambient noise indicates that the reliability or utility of camera-based presence detection has increased because there are fewer persons in the vicinity of the user device. For example, the second trigger condition may include the ambient noise information satisfying a second pre-determined relationship with an ambient noise threshold.

In some embodiments, power management system(s) 114 may determine, based on ambient color information from sensor(s) 106, that the ambient color indicates, for example, a location (e.g., indoors, or outdoors) or time of day (e.g., sunrise or sunset) at which camera-based presence detection system has an increased reliability or utility. For example, the second trigger condition may include the ambient color information satisfying a second pre-determined relationship with an ambient color condition.

In some embodiments, power management system(s) 114 may determine, based on proximity information from sensor(s) 106, that user device 102 is not in proximity to an obstruction that reduces the reliability or utility of camera-based presence detection. For example, the second trigger condition may include the proximity information satisfying a second pre-determined relationship with a distance threshold. In some embodiments, the proximity information may be based on, for example, a radar-based sensor, a sonar-based or ultrasonic-based sensor, an infrared-based sensor, a radio frequency sensor, a lidar sensor, and/or a biometric sensor.

In some embodiments, power management system(s) 114 may determine, based on humidity information from sensor(s) 106, that condensation is not present on camera(s) 110 that may reduce the reliability or utility of camera-based presence detection. For example, the second trigger condition may include the humidity information satisfying a second pre-determined relationship with a humidity threshold. In some embodiments, the humidity information may be based on, for example, a hygrometer, a relative humidity sensor, a thermometer, an ambient temperature sensor, and/or any similar sensor capable of providing information necessary to calculate the relative humidity.

In some embodiments, power management system(s) 114 may determine, based on inertial information from sensor(s) 106, that the movement or orientation of user device 102 does not reduce the reliability or utility of camera-based presence detection. For example, the second trigger condition may include inertial information indicating a movement or orientation satisfying a second pre-determined condition. In some embodiments, the inertial information may be determined based on, for example, an accelerometer, a gyroscope, a Global Positioning System (GPS) sensor, an inertial measurement unit, a compass sensor, a motion sensor, and/or a gravity sensor.

In some embodiments, power management system(s) 114 may determine, based on magnetic field information from sensor(s) 106, that a lid or cover of user device 102 is not in a position that reduces the reliability or utility of camera-based presence detection. For example, the second trigger condition may include the magnetic field information satisfying a second pre-determined relationship with a threshold. In some embodiments, the magnetic field information may be determined based on, for example, a magnetometer, and/or a Hall sensor.

In some embodiments, power management system(s) 114 may determine, based on hinge angle information from sensor(s) 106, that a lid or cover of user device 102 is not in a position that reduces the reliability or utility of camera-based presence detection. For example, the second trigger condition may include the hinge angle information satisfying a second pre-determined relationship with an angle threshold. In some embodiments, the hinge angle information may be determined based on, for example, a hinge angle sensor.

In some embodiments, power management system(s) 114 may determine, based on directional orientation information from sensor(s) 106, that user device 102 is not oriented in a direction that may reduce the reliability or utility of camera-based presence detection. For example, the second trigger condition may include the directional orientation information satisfying a pre-determined condition. For example, the reliability or utility of camera-based presence detection may be reduced if user device 102 is oriented in a direction that obscures camera(s) 110. For instance, the second trigger condition may be satisfied when camera(s) 110 are not pointing up (e.g., toward the ceiling or the sky) and not pointing down (e.g., toward a desk or the floor). In some embodiments, the directional orientation information may be determined based on, for example, an accelerometer, a gyroscope, an inertial measurement unit, a compass sensor, a motion sensor, and/or a gravity sensor.

In some embodiments, power management system(s) 114 may determine, based on power state information from sensor(s) 106 and/or power management system(s) 114, that user device 102 is in a power state (e.g., plugged into an outlet) that increases the reliability or utility of camera-based presence detection. For instance, when user device 102 is plugged into an external power source, the costs of operating camera-based presence detection system 108 are minimal. In some instances, the second trigger condition may include the power state information indicating a battery level satisfying a second pre-determined relationship with a battery-level threshold. In some instances, the second trigger condition may include the power state information indicating that user device 102 is plugged into an external power source. In some instances, the second trigger condition may include the power state information indicating a user has activated a power switch of user device 102.

In some embodiments, power management system(s) 114 may determine, based on image saturation information from sensor(s) 106, camera(s) 110, and/or image processing system 112, that the image information from camera(s) 110 is not in a state (e.g., oversaturated or undersaturated) that may reduce the reliability or utility of camera-based presence detection. For example, when an image sensor of camera(s) 110 is oversaturated or undersaturated, the image sensor may not provide enough useful information for camera-based presence detection system 108 to reliably determine the presence of a user. In some instances, the second trigger condition may include image saturation information satisfying a second pre-determined relationship with one or more thresholds.

In some embodiments, power management system(s) 114 may determine, based on image analysis performed by image processing system 112 on images or frames from camera(s) 110. For example, image processing system 112 may determine the absence of persons or things that may reduce the reliability or utility of camera-based presence detection. Based on this information, power management system(s) 114 may modify operating parameter(s) of camera-based presence detection system 108.

In some instances, image processing system 112 may detect, by analyzing images or frames from camera(s) 110, a number of persons in the image or frame. In some instances, the second trigger condition may include the number of persons detected satisfying a second pre-determined relationship with a threshold. In some embodiments, the number of persons in the image or frame may be determined using a machine learning model or classifier.

In some instances, image processing system 112 may determine, by analyzing images or frames from camera(s) 110, the absence of an object (e.g., ceiling, floor, keyboard, sky, etc.) in the image or frame. In some instances, the second trigger condition may include the determination of the absence of a pre-determined object (e.g., ceiling, floor, keyboard, sky, etc.) in the image or frame. In some embodiments, the object(s) may be determined using a machine learning model or classifier.

In some instances, image processing system 112 may determine, by analyzing images or frames from camera(s) 110, the absence of an obstruction that reduces the reliability or utility of camera-based presence detection system 108. For example, the absence of an obstruction may be determined based on the lack of low inter-frame differences for at least a portion of the image or frame, or based on object detection using a machine learning model or classifier. In some instances, the second trigger condition may include the inter-frame difference (e.g., percentage) satisfying a second pre-determined relationship with one or more thresholds.

In some instances, image processing system 112 may detect, by analyzing images or frames from camera(s) 110, an inter-frame difference in the image or frame. For example, a low inter-frame difference may indicate an environment where camera-based presence detection system 108 has improved reliability or utility. In some instances, the second trigger condition may include the inter-frame difference (e.g., percentage) satisfying a second pre-determined relationship with one or more thresholds.

In some embodiments, the second condition may include the detection of a user resetting or rebooting user device 102 based on information from power management system(s) 114 and/or sensor(s) 106 (e.g., power switch).

In some embodiments, the first and second trigger conditions use threshold(s) that are different to avoid modifying the operating parameter(s) of camera-based presence detection system 108 too frequently. In some embodiments, the first and/or the second trigger condition may operate with a time delay to avoid modifying the operating parameter(s) of camera-based presence detection system 108 too frequently.

In step 306, an operating parameter of the camera-based presence detection system is modified. For example, power management system(s) 114 may enable one or more of camera(s) 110, increase a frame rate of one or more of camera(s) 110, increase a frame processing rate of image processing system 112, increase a distance-based threshold at which camera-based presence detection system 108 returns a positive result indicating the presence of a user, and/or decrease a confidence-based threshold at which camera-based presence detection system 108 returns a positive result indicating the presence of a user. Such modifications increase the responsiveness of camera-based presence detection system 108 resulting in a better user experience.

In some embodiments, the second context information is compared to a pre-determined threshold to determine whether the second trigger condition is satisfied. In other embodiments, an aggregate score may be calculated using the second context information, and the aggregate score is compared to a pre-determined threshold to determine whether the second trigger condition is satisfied. In some embodiments, the aggregate score may be calculated using a weighted function by multiplying one or more weights with one or more second context information, including, but not limited to, ambient light information, ambient noise information, ambient color information, proximity information, humidity information, inertial information, magnetic field information, hinge angle information of a hinge of the user device, directional orientation information of the user device, power state information of the user device, image saturation information, a number of persons detected by the camera-based presence detection system, an object detected by the camera-based presence detection system, an obstruction detected by the camera-based presence detection system, an inter-frame difference, and/or a count of false wake events, to obtain one or more weighted second context information, and subsequently performing an operation (e.g., add, subtract, multiply, divide) on the one or more weighted second context information. In some embodiments, one or more of the weights may be predetermined. In some embodiments, one or more of the weights may be, dynamically and/or automatically, modified based on the values of one or more of the factors. In other embodiments, the aggregate score may be an output from a machine learning model.

Figure 4:
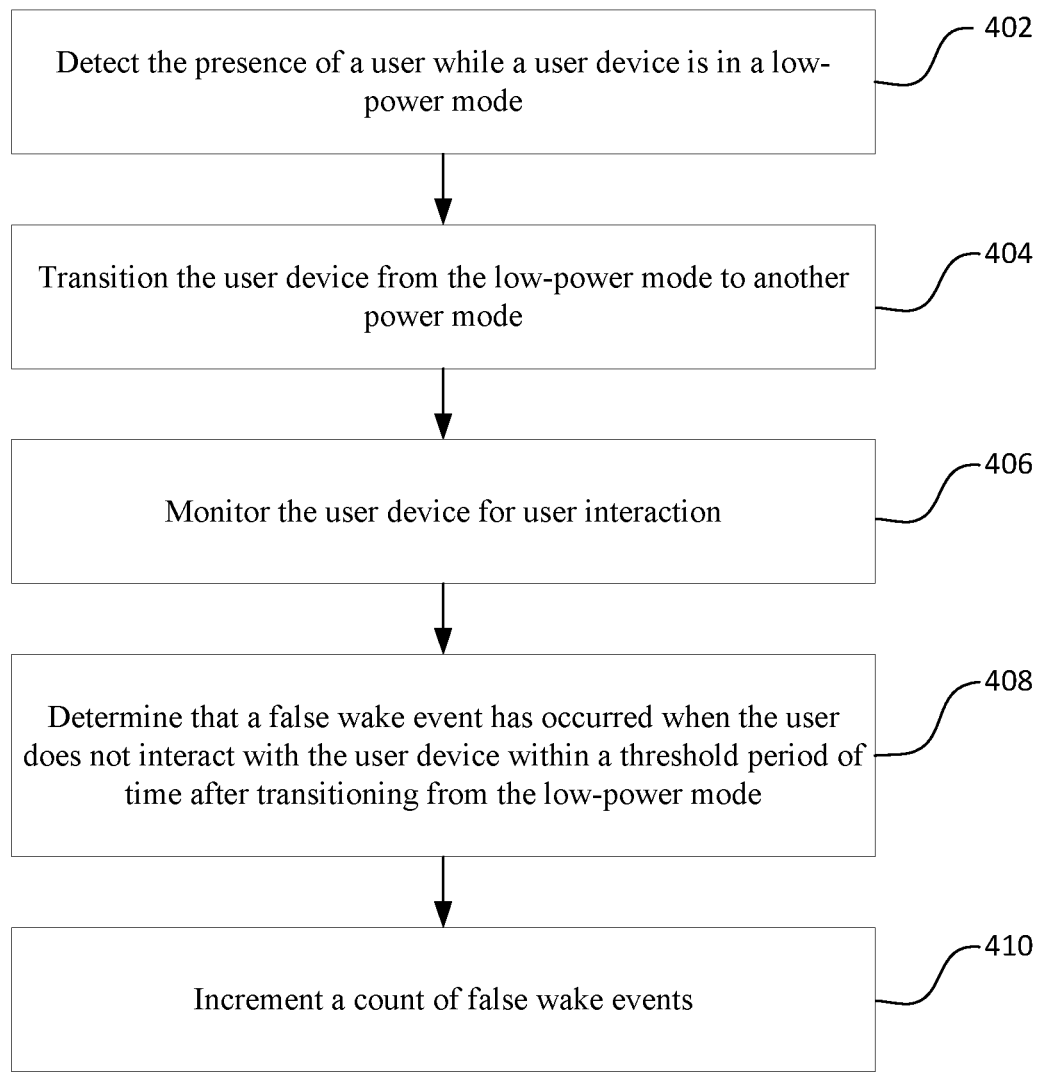
FIG. 4 depicts a flowchart of a process for determining the reliability and/or utility of a camera-based detection system, in accordance with an embodiment.

To further illustrate the foregoing features of user device 102, FIG. 4 is described. FIG. 4 depicts a flowchart 400 of a process for determining the reliability and/or utility of a camera-based detection system. System 100 may operate according to flowchart 400 in embodiments. Note that not all steps of flowchart 400 need be performed in embodiments. Further structural and operational embodiments will be apparent to persons skilled in the relevant art(s) based on the following description of FIG. 4. FIG. 4 is described as follows with reference to system 100 of FIG. 1.

Flowchart 400 begins at step 402. In step 402, the presence of a user is detected while the user device is in a low-power mode. For example, camera-based presence detection system 108 may detect the presence of a user by using image processing system 112 to analyze image or frame information collected by camera(s) 110. In some embodiments, camera-based presence detection system 108 may detect the presence of a user using facial recognition technology, voice recognition technology, and/or a machine learning model or classifier. In some embodiments, camera-based presence detection system 108 may detect only the user associated with user device 102. In other embodiments, camera-based presence detection system 108 may detect the presence of any user. In some embodiments, camera-based presence detection system 108 may detect the presence of a user based on inter-frame differences. For example, analyzing differences between sequential images or frame collected by camera(s) 110 may indicate changes in the image or frame indicative of movement of an object or person.

In step 404, the user device is transitioned from the low-power mode to another power mode. For example, the output from camera-based presence detection system 108 may cause power management system(s) 114 to transition sensor(s) 106, processor(s) 104, and/or any other component of user device 102 from a state of zero or low power consumption to a state of higher power consumption. In some embodiments, power management system(s) 114 may cause a display (not depicted) of user device 102 to turn on and display information relevant to the user (e.g., login screen or notifications). In some embodiments, power management system(s) 114 may activate a network connection to retrieve any new messages or notifications.

In step 406, the user device is monitored for user interaction. For example, power management system(s) 114 may monitor sensor(s) 106 and/or other input devices (e.g., keyboard, mouse, trackpad, touchscreen, eye tracking (gaze) sensor, etc.) of user device 102 to determine whether the user interacts with user device 102. Alternatively, the monitoring may be performed by another component of user device 102 that sets a flag to indicate to power management system(s) 114 whether the user has interacted with the user device since transitioning from the low-power mode.

In step 408, a false wake event is determined to have occurred when the user does not interact with the user device within a threshold period of time. For example, power management system(s) 114 may employ a countdown timer to cause it to check a flag or other indicator to determine whether the user has interacted with user device 102 in the period of time. If the user has not interacted with user device 102 in the period of time, power management system(s) 114 determines that a false wake event has occurred.

In step 410, a count of false wake events is incremented. For example, power management system(s) 114 may employ a counter to maintain a count of false wake events indicating the number of times camera-based presence detection system 108 transitions user device 102 from the low-power mode to the other power mode without the user interacting with user device 102 within the period of time. In some embodiments, the count of false wake events may include all false wake events occurring in the period of time elapsed from the time the user device enters into the low-power mode after a user inactivity timeout. In some embodiments, the count of false wake events may include all false wake events occurring in the period of time elapsed starting a predetermined amount of time after the user device enters into the low-power mode after a user inactivity timeout. In some embodiments, the count of false wake events may include all false wake events occurring in a sliding window of time.

In some embodiments, the count of false wake events may be included in the first and/or second context information and used to determine whether the first and/or second trigger conditions are satisfied. Furthermore, the count of false wake events may also be used to adjust weight(s) associated with weighted function(s) used to determine whether the first and/or second trigger conditions are satisfied. For example, when the count of false wake events satisfies a pre-determined relationship with a false wake threshold, power management system(s) 114 may modify operating parameter(s) of camera-based presence detection system 108. Similarly, when the count of false wake events during a pre-determined period of time satisfies a pre-determined relationship with a false wake threshold, power management system(s) 114 may modify operating parameter(s) of camera-based presence detection system 108. In both scenarios, a high count of false wake events may indicate a reduced reliability or utility of camera-based presence detection system 108 under the current and/or recent environmental or situational context. As such, modifying operating parameter(s) of camera-based presence detection system 108 based on the count of false wake events may result in less false wake events and in power consumption savings.

III. Example Mobile Device and Computer System Implementation

The systems and methods described above in reference to FIGS. 1-4, including user device 102, processor(s) 104, sensor(s) 106, camera-based presence detection system 108, camera(s) 110, image processing system 112, power management system(s) 114, and/or each of the components described therein, and the steps of flowcharts 200, 300, and/or 400 may be implemented in hardware, or hardware combined with one or both of software and/or firmware. For example, user device 102, processor(s) 104, sensor(s) 106, camera-based presence detection system 108, camera(s) 110, image processing system 112, power management system(s) 114, and/or each of the components described therein, and the steps of flowcharts 200, 300, and/or 400 may be each implemented as computer program code/instructions configured to be executed in one or more processors and stored in a computer readable storage medium. Alternatively, user device 102, processor(s) 104, sensor(s) 106, camera-based presence detection system 108, camera(s) 110, image processing system 112, power management system(s) 114, and/or each of the components described therein, and the steps of flowcharts 200, 300, and/or 400 may be each implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 5:
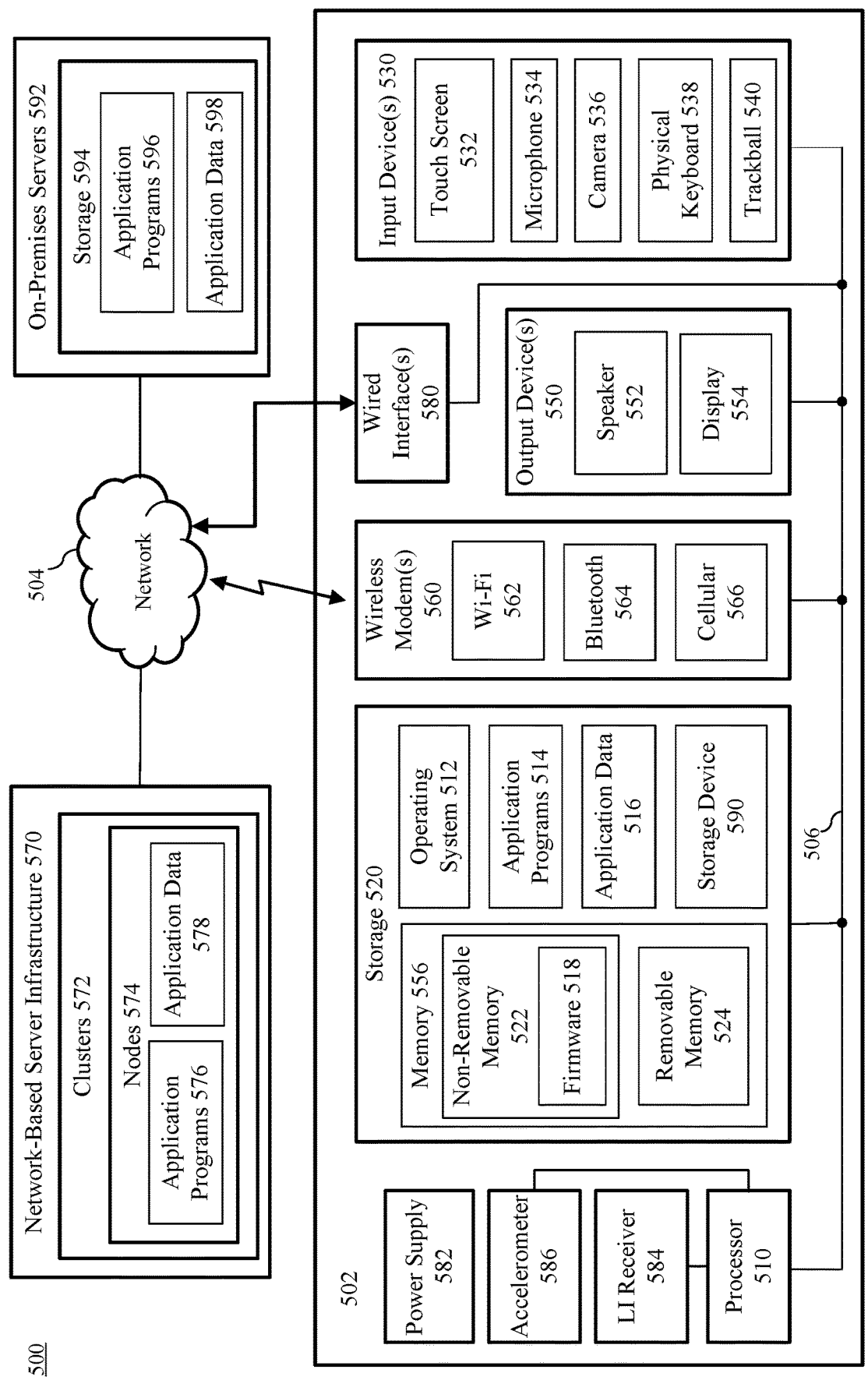
FIG. 5 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices, such as system 100 of FIG. 1, in which embodiments may be implemented are described as follows with respect to FIG. 5. FIG. 5 shows a block diagram of an exemplary computing environment 500 that includes a computing device 502. In some embodiments, computing device 502 is communicatively coupled with devices (not shown in FIG. 5) external to computing environment 500 via network 504. Network 504 comprises one or more networks such as local area networks (LANs), wide area networks (WANs), enterprise networks, the Internet, etc., and may include one or more wired and/or wireless portions. Network 504 may additionally or alternatively include a cellular network for cellular communications. Computing device 502 is described in detail as follows.

Computing device 502 can be any of a variety of types of computing devices. For example, computing device 502 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 502 may alternatively be a stationary computing device such as a desktop computer, a personal computer (PC), a stationary server device, a minicomputer, a mainframe, a supercomputer, etc.

As shown in FIG. 5, computing device 502 includes a variety of hardware and software components, including a processor 510, a storage 520, one or more input devices 530, one or more output devices 550, one or more wireless modems 560, one or more wired interfaces 580, a power supply 582, a location information (LI) receiver 584, and an accelerometer 586. Storage 520 includes memory 556, which includes non-removable memory 522 and removable memory 524, and a storage device 590. Storage 520 also stores an operating system 512, application programs 514, and application data 516. Wireless modem(s) 560 include a Wi-Fi modem 562, a Bluetooth modem 564, and a cellular modem 566. Output device(s) 550 includes a speaker 552 and a display 554. Input device(s) 530 includes a touch screen 532, a microphone 534, a camera 536, a physical keyboard 538, and a trackball 540. Not all components of computing device 502 shown in FIG. 5 are present in all embodiments, additional components not shown may be present, and any combination of the components may be present in a particular embodiment. These components of computing device 502 are described as follows.

A single processor 510 (e.g., central processing unit (CPU), microcontroller, a microprocessor, signal processor, ASIC (application specific integrated circuit), and/or other physical hardware processor circuit) or multiple processors 510 may be present in computing device 502 for performing such tasks as program execution, signal coding, data processing, input/output processing, power control, and/or other functions. Processor 510 may be a single-core or multi-core processor, and each processor core may be single-threaded or multithreaded (to provide multiple threads of execution concurrently). Processor 510 is configured to execute program code stored in a computer readable medium, such as program code of operating system 512 and application programs 514 stored in storage 520. Operating system 512 controls the allocation and usage of the components of computing device 502 and provides support for one or more application programs 514 (also referred to as "applications" or "apps"). Application programs 514 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 502 can communicate with any other component according to function, although not all connections are shown for ease of illustration. For instance, as shown in FIG. 5, bus 506 is a multiple signal line communication medium (e.g., conductive traces in silicon, metal traces along a motherboard, wires, etc.) that may be present to communicatively couple processor 510 to various other components of computing device 502, although in other embodiments, an alternative bus, further buses, and/or one or more individual signal lines may be present to communicatively couple components. Bus 506 represents one or more of any of several types of bus structures, including a memory bus or memory controller, a peripheral bus, an accelerated graphics port, and a processor or local bus using any of a variety of bus architectures.

Storage 520 is physical storage that includes one or both of memory 556 and storage device 590, which store operating system 512, application programs 514, and application data 516 according to any distribution. Non-removable memory 522 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 522 may include main memory and may be separate from or fabricated in a same integrated circuit as processor 510. As shown in FIG. 5, non-removable memory 522 stores firmware 518, which may be present to provide low-level control of hardware. Examples of firmware 518 include BIOS (Basic Input/Output System, such as on personal computers) and boot firmware (e.g., on smart phones). Removable memory 524 may be inserted into a receptacle of or otherwise coupled to computing device 502 and can be removed by a user from computing device 502. Removable memory 524 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 590 may be present that are internal and/or external to a housing of computing device 502 and may or may not be removable. Examples of storage device 590 include a hard disk drive, a SSD, a thumb drive (e.g., a USB (Universal Serial Bus) flash drive), or other physical storage device.

One or more programs may be stored in storage 520. Such programs include operating system 512, one or more application programs 514, and other program modules and program data. Examples of such application programs may include, for example, computer program logic (e.g., computer program code/instructions) for implementing one or more of user device 102, processor(s) 104, sensor(s) 106, camera-based presence detection system 108, camera(s) 110, image processing system 112, power management system(s) 114, and/or each of the components described therein, and the steps of flowcharts 200, 300, and/or 400, and/or each of the components described therein, along with any components and/or subcomponents thereof, as well as the flowcharts/flow diagrams (e.g., flowcharts 200, 300, and/or 400) described herein, including portions thereof, and/or further examples described herein.

Storage 520 also stores data used and/or generated by operating system 512 and application programs 514 as application data 516. Examples of application data 516 include web pages, text, images, tables, sound files, video data, and other data, which may also be sent to and/or received from one or more network servers or other devices via one or more wired or wireless networks. Storage 520 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 502 through one or more input devices 530 and may receive information from computing device 502 through one or more output devices 550. Input device(s) 530 may include one or more of touch screen 532, microphone 534, camera 536, physical keyboard 538 and/or trackball 540 and output device(s) 550 may include one or more of speaker 552 and display 554. Each of input device(s) 530 and output device(s) 550 may be integral to computing device 502 (e.g., built into a housing of computing device 502) or external to computing device 502 (e.g., communicatively coupled wired or wirelessly to computing device 502 via wired interface(s) 580 and/or wireless modem(s) 560). Further input devices 530 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 554 may display information, as well as operating as touch screen 532 by receiving user commands and/or other information (e.g., by touch, finger gestures, virtual keyboard, etc.) as a user interface. Any number of each type of input device(s) 530 and output device(s) 550 may be present, including multiple microphones 534, multiple cameras 536, multiple speakers 552, and/or multiple displays 554.

One or more wireless modems 560 can be coupled to antenna(s) (not shown) of computing device 502 and can support two-way communications between processor 510 and devices external to computing device 502 through network 504, as would be understood to persons skilled in the relevant art(s). Wireless modem 560 is shown generically and can include a cellular modem 566 for communicating with one or more cellular networks, such as a GSM network for data and voice communications within a single cellular network, between cellular networks, or between the mobile device and a public switched telephone network (PSTN). Wireless modem 560 may also or alternatively include other radio-based modem types, such as a Bluetooth modem 564 (also referred to as a "Bluetooth device") and/or Wi-Fi 562 modem (also referred to as an "wireless adaptor"). Wi-Fi modem 562 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 564 is configured to communicate with another Bluetooth-capable device according to the Bluetooth short-range wireless technology standard(s) such as IEEE 802.15.1 and/or managed by the Bluetooth Special Interest Group (SIG).

Computing device 502 can further include power supply 582, LI receiver 584, accelerometer 586, and/or one or more wired interfaces 580. Example wired interfaces 580 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 580 of computing device 502 provide for wired connections between computing device 502 and network 504, or between computing device 502 and one or more devices/peripherals when such devices/peripherals are external to computing device 502 (e.g., a pointing device, display 554, speaker 552, camera 536, physical keyboard 538, etc.). Power supply 582 is configured to supply power to each of the components of computing device 502 and may receive power from a battery internal to computing device 502, and/or from a power cord plugged into a power port of computing device 502 (e.g., a USB port, an A/C power port). LI receiver 584 may be used for location determination of computing device 502 and may include a satellite navigation receiver such as a Global Positioning System (GPS) receiver or may include other type of location determiner configured to determine location of computing device 502 based on received information (e.g., using cell tower triangulation, etc.). Accelerometer 586 may be present to determine an orientation of computing device 502.

Note that the illustrated components of computing device 502 are not required or all-inclusive, and fewer or greater numbers of components may be present as would be recognized by one skilled in the art. For example, computing device 502 may also include one or more of a gyroscope, barometer, proximity sensor, ambient light sensor, digital compass, etc. Processor 510 and memory 556 may be co-located in a same semiconductor device package, such as being included together in an integrated circuit chip, FPGA, or system-on-chip (SOC), optionally along with further components of computing device 502.

In embodiments, computing device 502 is configured to implement any of the above-described features of flowcharts herein. Computer program logic for performing any of the operations, steps, and/or functions described herein may be stored in storage 520 and executed by processor 510.

In some embodiments, server infrastructure 570 may be present in computing environment 500 and may be communicatively coupled with computing device 502 via network 504. Server infrastructure 570, when present, may be a network-accessible server set (e.g., a cloud-based environment or platform). As shown in FIG. 5, server infrastructure 570 includes clusters 572. Each of clusters 572 may comprise a group of one or more compute nodes and/or a group of one or more storage nodes. For example, as shown in FIG. 5, cluster 572 includes nodes 574. Each of nodes 574 are accessible via network 504 (e.g., in a "cloud-based" embodiment) to build, deploy, and manage applications and services. Any of nodes 574 may be a storage node that comprises a plurality of physical storage disks, SSDs, and/or other physical storage devices that are accessible via network 504 and are configured to store data associated with the applications and services managed by nodes 574. For example, as shown in FIG. 5, nodes 574 may store application data 578.

Each of nodes 574 may, as a compute node, comprise one or more server computers, server systems, and/or computing devices. For instance, a node 574 may include one or more of the components of computing device 502 disclosed herein. Each of nodes 574 may be configured to execute one or more software applications (or "applications") and/or services and/or manage hardware resources (e.g., processors, memory, etc.), which may be utilized by users (e.g., customers) of the network-accessible server set. For example, as shown in FIG. 5, nodes 574 may operate application programs 576. In an implementation, a node of nodes 574 may operate or comprise one or more virtual machines, with each virtual machine emulating a system architecture (e.g., an operating system), in an isolated manner, upon which applications such as application programs 576 may be executed.

In an embodiment, one or more of clusters 572 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 572 may be a datacenter in a distributed collection of datacenters. In embodiments, exemplary computing environment 500 comprises part of a cloud-based platform such as Amazon Web Services® of Amazon Web Services, Inc. or Google Cloud Platform™ of Google LLC, although these are only examples and are not intended to be limiting.

In an embodiment, computing device 502 may access application programs 576 for execution in any manner, such as by a client application and/or a browser at computing device 502. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 502 may additionally and/or alternatively synchronize copies of application programs 514 and/or application data 516 to be stored at network-based server infrastructure 570 as application programs 576 and/or application data 578. For instance, operating system 512 and/or application programs 514 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 520 at network-based server infrastructure 570.

In some embodiments, on-premises servers 592 may be present in computing environment 500 and may be communicatively coupled with computing device 502 via network 504. On-premises servers 592, when present, are hosted within an organization's infrastructure and, in many cases, physically onsite of a facility of that organization. On-premises servers 592 are controlled, administered, and maintained by IT (Information Technology) personnel of the organization or an IT partner to the organization. Application data 598 may be shared by on-premises servers 592 between computing devices of the organization, including computing device 502 (when part of an organization) through a local network of the organization, and/or through further networks accessible to the organization (including the Internet). Furthermore, on-premises servers 592 may serve applications such as application programs 596 to the computing devices of the organization, including computing device 502. Accordingly, on-premises servers 592 may include storage 594 (which includes one or more physical storage devices such as storage disks and/or SSDs) for storage of application programs 596 and application data 598 and may include one or more processors for execution of application programs 596. Still further, computing device 502 may be configured to synchronize copies of application programs 514 and/or application data 516 for backup storage at on-premises servers 592 as application programs 596 and/or application data 598.

Embodiments described herein may be implemented in one or more of computing device 502, network-based server infrastructure 570, and on-premises servers 592. For example, in some embodiments, computing device 502 may be used to implement systems, clients, or devices, or components/subcomponents thereof, disclosed elsewhere herein. In other embodiments, a combination of computing device 502, network-based server infrastructure 570, and/or on-premises servers 592 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 520. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 514) may be stored in storage 520. Such computer programs may also be received via wired interface(s) 580 and/or wireless modem(s) 560 over network 504. Such computer programs, when executed or loaded by an application, enable computing device 502 to implement features of embodiments discussed herein. Accordingly, such computer programs represent controllers of the computing device 502.

Embodiments are also directed to computer program products comprising computer code or instructions stored on any computer-readable medium or computer-readable storage medium. Such computer program products include the physical storage of storage 520 as well as further physical storage types.

IV. Additional Example Embodiments

In an embodiment, a method of reducing power consumption of a user device, includes: receiving context information while the user device is in a low-power mode; determining, based on the context information, that a first trigger condition is satisfied, the satisfaction of the first trigger condition being indicative of a reduced reliability or utility of a camera-based presence detection system that is used to determine when to transition the user device from the low-power mode into another power mode; and modifying, based on the satisfaction of first trigger condition, an operating parameter of the camera-based presence detection system.

In an embodiment, modifying the operating parameter of the camera-based presence detection system comprises one or more of: disabling a camera of the camera-based presence detection system; decreasing a frame rate of the camera; decreasing a frame processing rate of an image processing system of the camera-based presence detection system; decreasing a distance-based threshold at which the camera-based presence detection system returns a positive result indicating the presence of a user; or increasing a confidence-based threshold at which the camera-based presence detection system returns a positive result indicating the presence of a user.

In an embodiment, the method further includes: receiving updated context information while the user device is in the low-power mode; determining, based on the updated context information, that a second trigger condition is satisfied, the satisfaction of the second trigger condition being indicative of an increased reliability or utility of the camera-based presence detection system; and performing, based on the satisfaction of the second trigger condition, one or more of: enabling a camera of the camera-based presence detection system; increasing a frame rate of the camera; increasing a frame processing rate of an image processing system of the camera-based presence detection system; increasing a distance-based threshold at which the camera-based presence detection system returns a positive result indicating the presence of a user; or decreasing a confidence-based threshold at which the camera-based presence detection system returns a positive result indicating the presence of a user.

In an embodiment, the method further includes: detecting, using the camera-based presence detection system, a presence of a user; causing the user device to transition from the low-power mode into the other power mode; monitoring the user device to determine whether the user interacts with the user device; determining that a false wake event has occurred when the user does not interact with the user device within a pre-determined period of time; and incrementing a count of false wake events.

In an embodiment, the context information includes the count of false wake events, and the first trigger condition includes whether a total number of false wake events during a period of time exceeds a threshold, where the period of time is one of: a period of time elapsed from the time the user device enters into the low-power mode after a user inactivity timeout; or a period of time elapsed starting a predetermined amount of time after the time the user device enters into the low-power mode after the user inactivity timeout.

In an embodiment, the context information includes one or more of: ambient light information; ambient noise information; ambient color information; proximity information; humidity information; inertial information; magnetic field information; hinge angle information of a hinge of the user device; directional orientation information of the user device; power state information of the user device; image saturation information; a number of persons detected by the camera-based presence detection system; an object detected by the camera-based presence detection system; an obstruction detected by the camera-based presence detection system; or an inter-frame difference.

In an embodiment, a user device including: one or more processors; and a computer-readable storage medium comprising computer-executable instructions stored thereon that, when executed by the one or more processors, causes the one or more processors to: receive context information while the user device is in a low-power mode; determine, based on the context information, that a first trigger condition is satisfied, the satisfaction of the first trigger condition being indicative of a reduced reliability or utility of a camera-based presence detection system that is used to determine when to transition the user device from the low-power mode into another power mode; and modify, based on the satisfaction of the first trigger condition, an operating parameter of the camera-based presence detection system.

In an embodiment, modifying the operating parameter of the camera-based presence detection system comprises one or more of: disabling a camera of the camera-based presence detection system; decreasing a frame rate of the camera; decreasing a frame processing rate of an image processing system of the camera-based presence detection system; decreasing a distance-based threshold at which the camera-based presence detection system returns a positive result indicating the presence of a user; or increasing a confidence-based threshold at which the camera-based presence detection system returns a positive result indicating the presence of a user.

In an embodiment, the instructions when executed by the one or more processors, further causes the processor to: receive updated context information while the user device is in the low-power mode; determine, based on the updates context information, that a second trigger condition is satisfied, the satisfaction of the second trigger condition being indicative of an increased reliability or utility of the camera-based presence detection system; and perform, based on the satisfaction of the second trigger condition, one or more of: enable a camera of the camera-based presence detection system; increase a frame rate of the camera; increase a frame processing rate of an image processing system of the camera-based presence detection system; increase a distance-based threshold at which the camera-based presence detection system returns a positive result indicating the presence of a user; or decrease a confidence-based threshold at which the camera-based presence detection system returns a positive result indicating the presence of a user.

In an embodiment, the instructions, when executed by the one or more processors, further causes the processor to: detect, using the camera-based presence detection system, a presence of a user; cause the user device to transition from the low-power mode into the other power mode; monitor the user device to determine whether the user interacts with the user device; determine that a false wake event has occurred when the user does not interact with the user device within a pre-determined period of time; and increment a count of false wake events.

In an embodiment, the context information includes the count of false wake events, and the first trigger condition includes whether a total number of false wake events during a period of time exceeds a threshold, where the period of time is one of: a period of time elapsed from the time the user device enters into the low-power mode after a user inactivity timeout; or a period of time elapsed starting a predetermined amount of time after the time the user device enters into the low-power mode after the user inactivity timeout.

In an embodiment, the context information includes one or more of: ambient light information; ambient noise information; ambient color information; proximity information; humidity information; inertial information; magnetic field information; hinge angle information of a hinge of the user device; directional orientation information of the user device; power state information of the user device; image saturation information; a number of persons detected by the camera-based presence detection system; an object detected by the camera-based presence detection system; an obstruction detected by the camera-based presence detection system; or an inter-frame difference.

In an embodiment, the one or more processors includes one or more of: a processor comprising a low-power component; a co-processor; an ultra-low-voltage processor; or an always-on processor.

In an embodiment, the context information is sensor-based information derived from one or more of: an ambient light sensor; an ambient noise sensor; an ambient color sensor; a proximity sensor; a microphone; a radio frequency detector; an accelerometer; a gyroscope; a Hall sensor; a hinge angle sensor; a magnetometer; a barometer; a hygrometer; a relative humidity sensor; a biometric sensor; a Global Positioning System (GPS) sensor; a radar sensor; an ultrasonic sensor; an infrared sensor; a power switch; an inertial measurement unit; a thermometer; an ambient temperature sensor; a compass sensor; a motion sensor; a gravity sensor; or a lidar sensor.

In an embodiment, a computer-readable storage medium includes computer-executable instructions stored thereon that, when executed by one or more processors of a user device, cause the one or more processors to: receive context information while the user device is in a low-power mode; determine, based on the context information, that a first trigger condition is satisfied, the satisfaction of the first trigger condition being indicative of a reduced reliability or utility of a camera-based presence detection system that is used to determine when to transition the user device from the low-power mode into another power mode; and modify, based on the satisfaction of the first trigger condition, an operating parameter of the camera-based presence detection system.

In an embodiment, modifying the operating parameter of the camera-based presence detection system comprises one or more of: disabling a camera of the camera-based presence detection system; decreasing a frame rate of the camera; decreasing a frame processing rate of an image processing system of the camera-based presence detection system; decreasing a distance-based threshold at which the camera-based presence detection system returns a positive result indicating the presence of a user; or increasing a confidence-based threshold at which the camera-based presence detection system returns a positive result indicating the presence of a user.

In an embodiment, the instructions, when executed by the one or more processors, further cause the one or more processors to: receive updated context information while the user device is in the low-power mode; determine, based on the updates context information, that a second trigger condition is satisfied, the satisfaction of the second trigger condition being indicative of an increased reliability or utility of the camera-based presence detection system; and perform, based on the satisfaction of the second trigger condition, one or more of: enable a camera of the camera-based presence detection system; increase a frame rate of the camera; increase a frame processing rate of an image processing system of the camera-based presence detection system; increase a distance-based threshold at which the camera-based presence detection system returns a positive result indicating the presence of a user; or decrease a confidence-based threshold at which the camera-based presence detection system returns a positive result indicating the presence of a user.

In an embodiment, the instructions, when executed by the one or more processors, further cause the one or more processors to: detect, using the camera-based presence system, a presence of a user; cause the user device to transition from the low-power mode into the other power mode; monitor the user device to determine whether the user interacts with the user device; determine that a false wake event has occurred when the user does not interact with the user device within a pre-determined period of time; and increment a count of false wake events.

In an embodiment, the context information includes the count of false wake events, and the first trigger condition includes whether a total number of false wake events during a period of time exceeds a threshold, where the period of time is one of: a period of time elapsed from the time the user device enters into the low-power mode after a user inactivity timeout; or a period of time elapsed starting a predetermined amount of time after the time the user device enters into the low-power mode after the user inactivity timeout.

In an embodiment, the context information includes one or more of: ambient light information; ambient noise information; ambient color information; proximity information; humidity information; inertial information; magnetic field information; hinge angle information of a hinge of the user device; directional orientation information of the user device; power state information of the user device; image saturation information; a number of persons detected by the camera-based presence detection system; an object detected by the camera-based presence detection system; an obstruction detected by the camera-based presence detection system; or an inter-frame difference.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed:

1. A method of reducing power consumption of a user device, comprising:
    detecting, using a camera-based presence detection system, a presence of a user;
    causing the user device to transition from a low-power mode into another power mode;
    monitoring the user device to determine whether the user interacts with the user device;

determining that a false wake event has occurred when the user does not interact with the user device within a first pre-determined period of time;

incrementing a count of false wake events;

receiving context information while the user device is in the low-power mode;

determining, based on the context information, that a total number of false wake events during a second pre-determined period of time exceeds a threshold, the total number of false wake event indicative of a number of times the camera-based presence detection system transitions the user device from the low-power mode to the other power mode without the user interacting with the user device within the first pre-determined period of time; and responsive to determining that the total number of false wake events during the second pre-determined period of time exceeds the threshold, decreasing a distance-based threshold at which the camera-based presence detection system returns a positive result indicating the presence of the user.

2. The method of claim 1, further comprising:

responsive to determining that the total number of false wake events during the second pre-determined period of time exceeds the threshold, modifying an operating parameter of the camera-based presence detection system that is used to determine when to transition the user device from the low power mode into the other power mode, wherein modifying the operating parameter of the camera-based presence detection system comprises one or more of:

disabling a camera of the camera-based presence detection system;

decreasing a frame rate of the camera;

decreasing a frame processing rate of an image processing system of the camera-based presence detection system; or increasing a confidence-based threshold at which the camera-based presence detection system returns a positive result indicating the presence of the user.

3. The method of claim 1, further comprising:

receiving updated context information while the user device is in the low-power mode;

determining, based on the updated context information, that a trigger condition is satisfied, the satisfaction of the trigger condition being indicative of an increased reliability or utility of the camera-based presence detection system; and performing, based on the satisfaction of the trigger condition, one or more of:

enabling a camera of the camera-based presence detection system;

increasing a frame rate of the camera;

increasing a frame processing rate of an image processing system of the camera-based presence detection system;

increasing the distance-based threshold at which the camera-based presence detection system returns a positive result indicating the presence of the user; or decreasing a confidence-based threshold at which the camera-based presence detection system returns a positive result indicating the presence of the user.

4. The method of claim 1, wherein the second pre-determined period of time is one of:

a period of time elapsed from the time the user device enters into the low-power mode after a user inactivity timeout; or a period of time elapsed starting a predetermined amount of time after the time the user device enters into the low-power mode after the user inactivity timeout.

5. The method of claim 1, wherein the context information comprises one or more of:

ambient light information;

ambient noise information;

ambient color information;

proximity information;

humidity information;

inertial information;

magnetic field information;

hinge angle information of a hinge of the user device;

directional orientation information of the user device;

power state information of the user device;

image saturation information;

a number of persons detected by the camera-based presence detection system;

an object detected by the camera-based presence detection system;

an obstruction detected by the camera-based presence detection system; or an inter-frame difference.

6. A user device, comprising:

one or more processors; and a computer-readable storage medium comprising computer-executable instructions stored thereon that, when executed by the one or more processors, causes the one or more processors to:

detect, using a camera-based presence detection system, a presence of a user;

cause the user device to transition from a low-power mode into another power mode;

monitor the user device to determine whether the user interacts with the user device;

determine that a false wake event has occurred when the user does not interact with the user device within a first pre-determined period of time;

increment a count of false wake events;

receive context information while the user device is in the low-power mode;

determine, based on the context information, that a total number of false wake events during a second pre-determined period of time exceeds a threshold, the total number of false wake event indicative of a number of times the camera-based presence detection system transitions the user device from the low-power mode to the other power mode without the user interacting with the user device within the first pre-determined period of time; and decrease, responsive to the determining that the total number of false wake events during the second pre-determined period of time exceeds the threshold, a distance-based threshold at which the camera-based presence detection system returns a positive result indicating the presence of the user.

7. The user device of claim 6, wherein the instructions, when executed by the one or more processors, further causes the processor to:

modify, responsive to determining that the total number of false wake events during the second pre-determined period of time exceeds the threshold, an operating parameter of the camera-based presence detection system that is used to determine when to transition the user device from the low power mode into the other power mode, wherein modifying the operating parameter of the camera-based presence detection system comprises one or more of:

disabling a camera of the camera-based presence detection system;

decreasing a frame rate of the camera;

decreasing a frame processing rate of an image processing system of the camera-based presence detection system; or increasing a confidence-based threshold at which the camera-based presence detection system returns a positive result indicating the presence of the user.

8. The user device of claim 6, wherein the instructions, when executed by the one or more processors, further causes the processor to:

receive updated context information while the user device is in the low-power mode;

determine, based on the updates context information, that a trigger condition is satisfied, the satisfaction of the trigger condition being indicative of an increased reliability or utility of the camera-based presence detection system; and perform, based on the satisfaction of the trigger condition, one or more of:

enable a camera of the camera-based presence detection system;

increase a frame rate of the camera;

increase a frame processing rate of an image processing system of the camera-based presence detection system;

increase the distance-based threshold at which the camera-based presence detection system returns a positive result indicating the presence of the user; or decrease a confidence-based threshold at which the camera-based presence detection system returns a positive result indicating the presence of the user.

9. The user device of claim 6, wherein the second pre-determined period of time is one of:

a period of time elapsed from the time the user device enters into the low-power mode after a user inactivity timeout; or a period of time elapsed starting a predetermined amount of time after the time the user device enters into the low-power mode after the user inactivity timeout.

10. The user device of claim 6, wherein the context information comprises one or more of:

ambient light information;

ambient noise information;

ambient color information;

proximity information;

humidity information;

inertial information;

magnetic field information;

hinge angle information of a hinge of the user device;

directional orientation information of the user device;

power state information of the user device;

image saturation information;

a number of persons detected by the camera-based presence detection system;

an object detected by the camera-based presence detection system;

an obstruction detected by the camera-based presence detection system; or an inter-frame difference.

11. The user device of claim 6, wherein the one or more processors comprises one or more of:

a processor comprising a low-power component;

a co-processor;

an ultra-low-voltage processor; or an always-on processor.

12. The user device of claim 6, wherein the context information is sensor-based information derived from one or more of:

an ambient light sensor;

an ambient noise sensor;

an ambient color sensor;

a proximity sensor;

a microphone;

a radio frequency detector;

an accelerometer;

a gyroscope;

a Hall sensor;

a hinge angle sensor;

a magnetometer;

a barometer;

a hygrometer;

a relative humidity sensor;

a biometric sensor;

a Global Positioning System (GPS) sensor;

a radar sensor;

an ultrasonic sensor;

an infrared sensor;

a power switch;

an inertial measurement unit;

a thermometer;

an ambient temperature sensor;

a compass sensor;

a motion sensor;

a gravity sensor; or a lidar sensor.

13. A computer-readable storage medium comprising computer-executable instructions stored thereon that, when executed by one or more processors of a user device, cause the one or more processors to:

detect, using a camera-based presence detection system, a presence of a user;

cause the user device to transition from a low-power mode into another power mode;

monitor the user device to determine whether the user interacts with the user device;

determine that a false wake event has occurred when the user does not interact with the user device within a first pre-determined period of time;

increment a count of false wake events;

receive context information while the user device is in the low-power mode;

determine, based on the context information, that a total number of false wake events during a second pre-determined period of time exceeds a threshold, the total number of false wake event indicative of a number of times the camera-based presence detection system transitions the user device from the low-power mode to the other power mode without the user interacting with the user device within the first pre-determined period of time; and decrease, responsive to the determining that the total number of false wake events during the second pre-determined period of time exceeds the threshold, a distance-based threshold at which the camera-based presence detection system returns a positive result indicating the presence of the user.

14. The computer-readable storage medium of claim 13, wherein the instructions, when executed by the one or more processors, further cause the one or more processors to:

modify, responsive to determining that the total number of false wake events during the second pre-determined period of time exceeds the threshold, an operating parameter of the camera-based presence detection system that is used to determine when to transition the user device from the low-power mode into the other power mode, wherein modifying the operating parameter of the camera-based presence detection system comprises one or more of:

disabling a camera of the camera-based presence detection system;

decreasing a frame rate of the camera;

decreasing a frame processing rate of an image processing system of the camera-based presence detection system; or increasing a confidence-based threshold at which the camera-based presence detection system returns a positive result indicating the presence of the user.

15. The computer-readable storage medium of claim 13, wherein the instructions, when executed by the one or more processors, further cause the one or more processors to:

receive updated context information while the user device is in the low-power mode;

determine, based on the updates context information, that a trigger condition is satisfied, the satisfaction of the trigger condition being indicative of an increased reliability or utility of the camera-based presence detection system; and perform, based on the satisfaction of the trigger condition, one or more of:

enable a camera of the camera-based presence detection system;

increase a frame rate of the camera;

increase a frame processing rate of an image processing system of the camera-based presence detection system;

increase the distance-based threshold at which the camera-based presence detection system returns a positive result indicating the presence of the user; or decrease a confidence-based threshold at which the camera-based presence detection system returns a positive result indicating the presence of the user.

16. The computer-readable storage medium of claim 13, wherein the second pre-determined period of time is one of:

a period of time elapsed from the time the user device enters into the low-power mode after a user inactivity timeout; or a period of time elapsed starting a predetermined amount of time after the time the user device enters into the low-power mode after the user inactivity timeout.

17. The computer-readable storage medium of claim 13, wherein the context information comprises one or more of:

ambient light information;
ambient noise information;
ambient color information;
proximity information;
humidity information;
inertial information;
magnetic field information;
hinge angle information of a hinge of the user device;
directional orientation information of the user device;
power state information of the user device;
image saturation information;
a number of persons detected by the camera-based presence detection system;
an object detected by the camera-based presence detection system;
an obstruction detected by the camera-based presence detection system; or
an inter-frame difference.

* * * * *